US012783718B2

(12) United States Patent
Erramilli

(10) Patent No.: US 12,783,718 B2
(45) Date of Patent: Nov. 3, 2026

(54) TECHNIQUES TO PERFORM AUTHORIZATION ON LARGE LANGUAGE MODEL RESPONSES

(71) Applicant: Salesforce, Inc., San Francisco, CA (US)

(72) Inventor: Vijay Erramilli, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 196 days.

(21) Appl. No.: 18/744,579

(22) Filed: Jun. 14, 2024

(65) Prior Publication Data

US 2025/0384157 A1 Dec. 18, 2025

(51) Int. Cl.
*H04L 29/06* (2006.01)
*G06F 21/62* (2013.01)

(52) U.S. Cl.
CPC .. *G06F 21/6245* (2013.01); *G06F 2221/2113* (2013.01); *G06F 2221/2141* (2013.01)

(58) Field of Classification Search
CPC ......... G06F 21/6245; G06F 2221/2113; G06F 2221/2141
See application file for complete search history.

(56) References Cited

U.S. PATENT DOCUMENTS

2025/0200028 A1* 6/2025 St. Martin .............. G06F 40/56
2025/0371263 A1* 12/2025 Rothschild .............. G06F 40/20

* cited by examiner

*Primary Examiner* — Evans Desrosiers
(74) *Attorney, Agent, or Firm* — Holland & Hart, LLP.

(57) ABSTRACT

An application server may receive, from a user and at an interface for accessing a large language model, a request for a response from the large language model. In some cases, the request may include a prompt for the large language model and data access role information associated with the user. The application server may retrieve, from a data source including a set of data objects, one or more data objects for inputting to the large language model based on comparing the data access role information associated with the user with data access policy information associated with the one or more data objects. The application server may then input, via a model interface, the one or more data objects to the large language model, and may receive, via the model interface, an output of the large language model based on the one or more data objects.

18 Claims, 9 Drawing Sheets

TECHNIQUES TO PERFORM AUTHORIZATION ON LARGE LANGUAGE MODEL RESPONSES

FIELD OF TECHNOLOGY

The present disclosure relates generally to database systems and data processing, and more specifically to techniques to perform authorization on large language model responses.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

DETAILED DESCRIPTION

Figure 1:
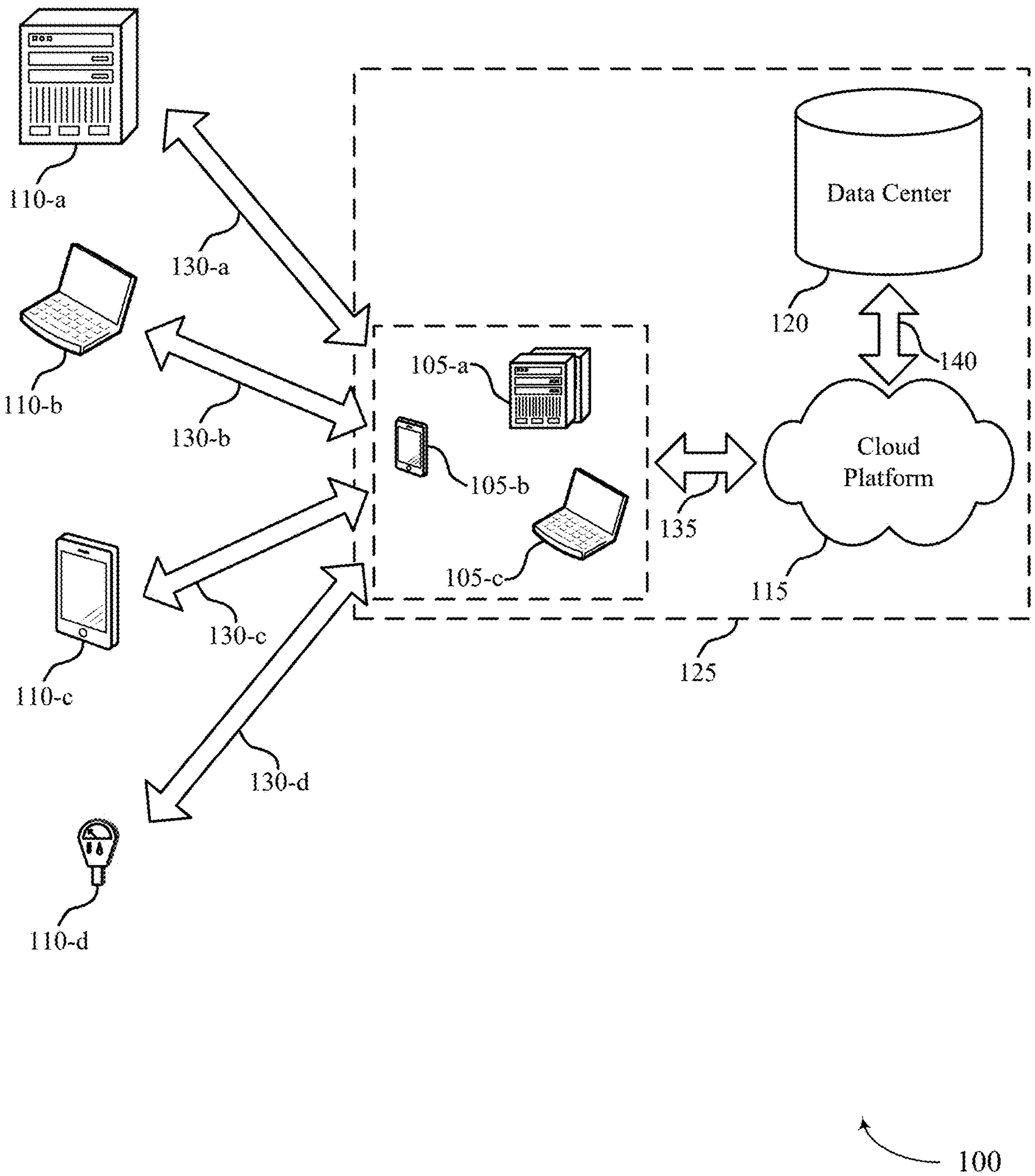
FIG. 1 illustrates an example of a method for data processing system that supports techniques to perform authorization on large language model responses in accordance with aspects of the present disclosure.

A cloud platform may be accessible by various organizations, users, and the like, and may support access to machine learning models to use for various tasks, such as customer relationship management (CRM) related tasks. However, the cloud platform may have access to various types of data, such as sensitive data (e.g., personally identifiable information (PII)) or other data that all users may not have access to (such as, salary information, other confidential information). In some instances, a user (e.g., a tenant) may not want such sensitive data ingested by external systems such as a system that supports machine learning models such as a large language model. However, large language models may not be able to impose one or more authorization controls (e.g., role based access controls) on the output. This may be because either the controls on input data are ignored when undergoing training or fine-tuning process of the large language model, or there may not be a mechanism to perform role based access control checks on data elements prior to ingesting the data to the large language model. In such a case, it may be challenging to maintain privacy of sensitive data in case of some machine learning applications (e.g., large language model applications).

One or more aspects of the present disclosure may provide for an authorization technique used to modify an input to a machine learning model (e.g., a large language model). An application server may receive a request from a user for a large language model response. In some examples, the user may be an administrator or a customer or a different user. The user may provide a prompt or a query via an interface associated with the large language model. Prior to receiving the request, the application server may transform data (enterprise data) to content comprehensible by the large language model. For example, the application server (at a retrieval module) may transform the data that is to be queried, to vectors, which may then be stored in a vector database.

According to the one or more aspects depicted herein, during the transformation phase, the application server may augment the vector database with metadata associated with the document or record related to a specific data record (e.g., line of text, value etc.) included in the input. The application server may further augment the vector database with an access control policy associated with the document or data record. Upon reception of the user input (e.g., query, request, etc.), the application server, during a retrieval phase, may convert the user input along with the user authorization information (e.g., user role information) into a vector. This vector may then be used to query the vector database to retrieve the similar objects to the converted prompt. For example, the application server may compare a user's role information to the policies associated with the retrieved objects (stored in the vector database). If the policies are satisfied, then the application server may provide the objects to the large language model for further processing. If the policies are not satisfied, then the application server may provide a response to the user indicating that their query cannot be satisfied with the data provided. Thus, using the techniques depicted herein, the large language model responses may be modified to be based on data objects that pass the authorization check. Thus, according to the aspects depicted herein, a user may receive a response that is generated with authorized data objects and may not include any sensitive information (e.g., information that the user is not authorized to access).

Aspects of the disclosure are initially described in the context of an environment supporting an on-demand database service. Aspects of the disclosure are further illustrated by and described with reference to a computing environment and a process flow. Aspects of the disclosure are further illustrated by and described with reference to apparatus diagrams, system diagrams, and flowcharts that relate to techniques to perform authorization on large language model responses.

FIG. 1 illustrates an example of a system 100 for cloud computing that supports techniques to perform authorization on large language model responses in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

As depicted herein, large language model driven applications may provide multiple customer AI offerings targeting different sectors from customer service, automatic code generation, novel knowledge retrieval, workflow automation etc. Large language models may power these offering and applications. Such large language models may be trained on a large corpus of public and private data. In such cases, a size of the large language model may also be large. While these large models have powerful capabilities for general use cases, they may not be able to perform well for enterprise use cases where private enterprise data is used (as they aren't trained on such data). In addition. most enterprises may have security or privacy or legal concerns, and may not be able to send this data to a third party large language model provider.

In some examples, one or more large language models may work with private enterprise data using a method called Retrieval Augmented Generation, where the large language model may be augmented by the private enterprise data by storing this data in a private data store (e.g., a vector database). In such an example, when a user enters a query (e.g., prompt or question), that query may first get routed to a private vector data store to get relevant results, and the results are then passed to the large language model along with the query to get a response in natural language (e.g., English), using those results. In other words, the large language model may work with only the results provided to answer the request in natural language.

However, in some examples, it may be challenging to impose authorization controls (e.g., role based access controls) on the output, as the controls on input data are either ignored when undergoing training/fine-tuning process. In some cases, it may be challenging to perform role based access control checks on data elements. In an example, building an enterprise chatbot over sales data, using private sales information, may be achieved via a retrieval augmented generation technique. However, the retrieval augmented generation technique may not be able to impose fine-grained role based access control, where some users can access all data via the chat interface, and some other users access only specific data via the same interface.

One or more aspects of the present disclosure provide for techniques to enable role based access control on responses generated by large language models. In some examples, the techniques of the present disclosure may implement a retrieval augmented generation architecture that includes a capability to provide citation metadata, on sources that go into the large language model responses. In some cases, the citation metadata may be augmented by one or more role based access controls policies on records. The computing system implementing the techniques described herein may check these policies during generation phase, by providing the role of the querying end-user via augmenting their respective prompt. This ensures record level authorization controls on large language model responses.

According to one or more aspects depicted herein, an application server may receive, from a user and at an interface for accessing a large language model, a request for a response from the large language model. In some cases, the request may include a prompt for the large language model and data access role information associated with the user. The application server may then retrieve, from a data source including a set of data objects, one or more data objects for inputting to the large language model based on comparing the data access role information associated with the user with data access policy information associated with the one or more data objects. The application server may then input, via a model interface, the one or more data objects to the large language model and may receive, via the model interface, an output of the large language model. In some cases, the application server may receive the output based on the one or more data objects. In some cases, the output may include the response to the request including the prompt.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
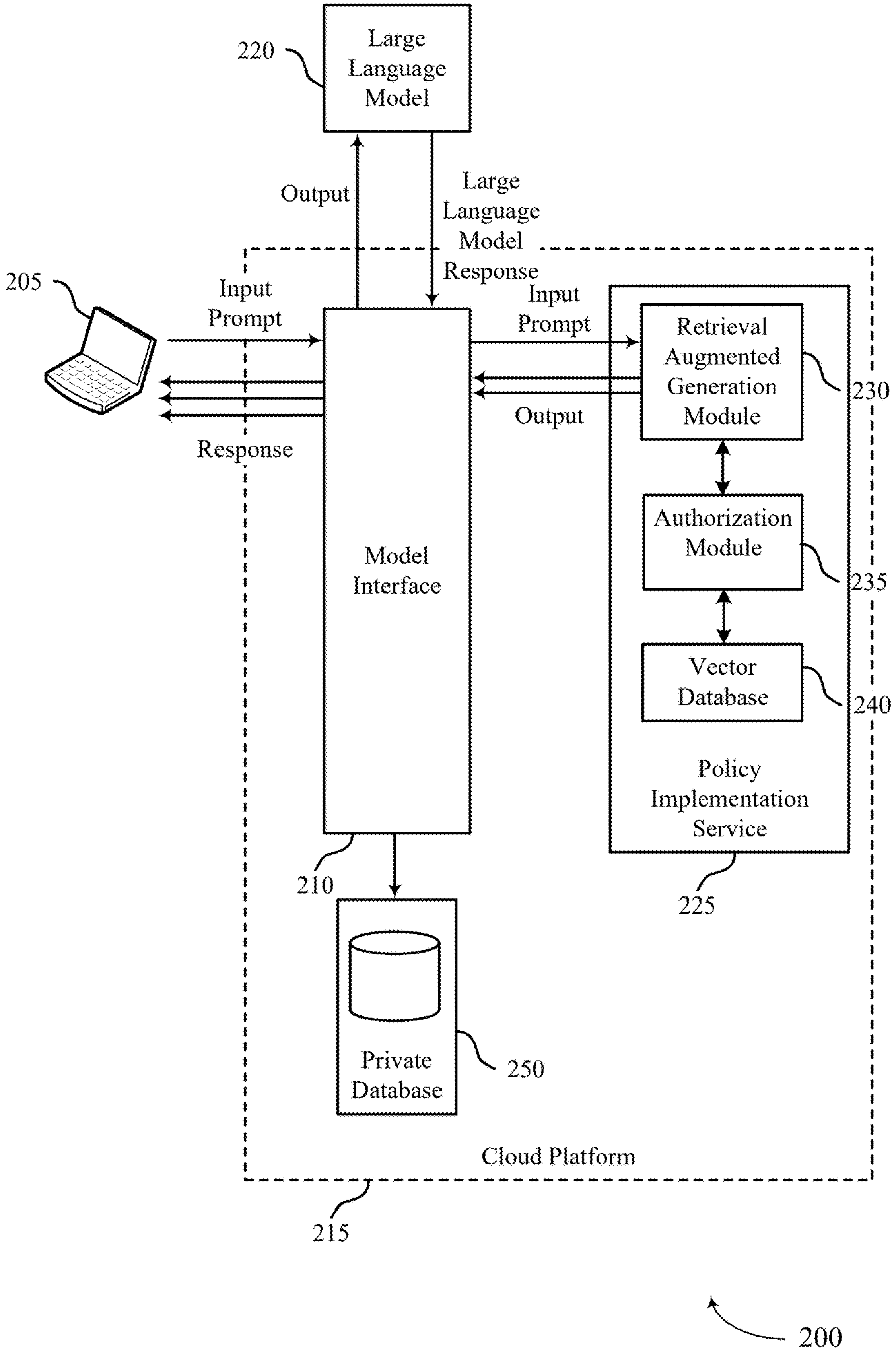
FIG. 2 shows an example of a computing system that supports techniques to perform authorization on large language model responses in accordance with aspects of the present disclosure.

FIG. 2 shows an example of a computing environment 200 that supports techniques to perform authorization on large language model responses in accordance with aspects of the present disclosure. The computing environment 200 includes a client 205, a cloud platform 215, and a large language model 220, which may be examples of aspects of FIG. 1. For example, the client 205 may be an example of a cloud client 105 or contact 110 of FIG. 1 and the cloud platform 215 may be an example of aspects of the subsystem 125 of FIG. 1, such as the cloud platform 115 or an application server. The client 205 may represent an application (e.g., a generative artificial intelligence (AI) application or service that is configured to access generative AI services) that is accessible by users, such as a user associated with a cloud client 105 including employees or customers (e.g., contacts 110). Aspects of the application may be hosted by the cloud platform 215. In some cases, one or more users may configure the application using aspects of the cloud platform 215, and the application may be configured for performing various tasks, for the cloud client 105, using generative AI.

The cloud platform 215 hosts various services for providing access to the large language model 220 by clients, such as the client 205. The cloud platform 215 may also host various other services, including CRM related services as described with respect to FIG. 1. As described herein, the cloud platform 215 may host services for content moderation for interfacing with the large language model 220. The large language model 220 may be an externally hosted large language model, such as a third party large language model hosted on servers separate from the servers that host the cloud platform 215. Additionally, or alternatively, the large language model may be hosted on servers associated with the cloud platform 215. In such cases, the cloud platform 215 may be configured to support a bring your own model (BYOM) approach, whereby clients can upload or configure a custom large language model at the cloud platform 215. As described herein, the cloud platform 215 hosts services and performs techniques for supporting data privacy, security, and content safety in large language model access. Whether cloud clients configure their own models or use a model configured with or supported by the cloud platform 215, a trust layer may be embedded with and used with other components of the cloud platform 215, such as various services supported by the cloud platform 215 including CRM services, communication services, and the like.

The cloud platform 215 may include a model interface 210, which receives or obtains input prompts from various applications, including the client 205. For example, the model interface 210 receives the input prompt from the client 205. The model interface 210 may be configured to facilitate various aspects of content moderation for inputting into a large language model, as described herein. Additionally, the content moderation or content authorization may be performed in accordance with authorization information. The authorization information may be associated with or configured in association with aspects of the cloud platform 215. In some cases, the client (e.g., cloud client 105) may configure one or more configuration parameters related to authorization of a particular user. More particularly, as the cloud platform 215 may host various different cloud clients 105 (e.g., tenants), each cloud client 105 may have a different and respective set of configuration parameters that are indicative of how the cloud platform 215 is implement authorization for large language model interaction.

According to one or more aspects of the present disclosure, the model interface 210 may receive an input prompt from the client 205 (e.g., user device). In some cases, the policy implementation service 225 may be able to impose role based access controls on a retrieval augmented generation based large language model applications. In some examples, the model interface 210 may be or otherwise include an interface that the user uses to enter prompts or queries. The model interface 210 may be a slack bot or a custom interface. This interface or bot may communicate or otherwise interface with the policy implementation service 225 (operating according to the retrieval augmented generation process (send/receive)) and may receive the prompt or query result from the large language model 220. As depicted herein, the model interface 210 may receive, from a user, a request for a response from the large language model 220. In some cases, the request may include a prompt for the large language model 220 and data access role information associated with the user.

As depicted herein, the model interface 210 may forward the received input prompt to the retrieval augmented generation module 230. The retrieval augmented generation module 230 may coordinate the retrieval and generation of data by transforming private data (e.g., retrieved from private database 250). In some examples, the retrieval augmented generation module 230 may transform a set of data records into a set of vectors, where the set of vectors include the set of data objects. The retrieval augmented generation module 230 may store, prior to receiving the request from the user, the set of vectors in the data source (e.g., vector database 240). In transforming of private data (e.g., private enterprise data) which is to be queried, the retrieval augmented generation module 230 may transform the data into vectors and stored into a vector database 240. Examples of a vector database 240 may include opensearch, pinecone etc. In some examples, the transformation may be performed by relying on an embedding process usually provided by the large language model 220 or a related embedding model. The transformed data may include a key-value pair, with the key being the vector coordinates of the piece of text or data object in a high dimensional space and the value being the piece of text or data object.

In some examples, the cloud platform 215 may augment the set of vectors stored in the data source (e.g., vector database 240) with role information metadata associated with each data record of the set of data records. In some cases, the data access policy information associated with the set of data objects may be based on the role information metadata. In some examples, the augmented set of vectors may include a set of key value pairs, and the role information metadata associated with each data record of the set of data records may be stored in a key of each corresponding key value pair of the set of key value pairs. In some cases, during the transformation phase, the policy implementation service 225 may augment the vector database 240 with metadata associated with the document/record that includes the specific data record (line of text, value etc.). In some examples, the model interface 210 may receive the metadata associated with one or more data records (e.g., from private database 250).

The model interface may transmit the metadata to the policy implementation service 225. The policy implementation service 225 may augment the vector data from along with the role based access control policy for that document. The authorization module 235 may use the metadata to provide citations, and determine if one or more roles that can access the document/record associated with a particular query. For instance, upon receiving an input prompt, the authorization module 235 may check the associated metadata (stored in the vector database 240) to check whether the user making the query satisfies a policy. The following examples depict the metadata in json format. The example metadata (e.g., Metadata 1, Metadata 2, and Metadata 3) may be stored in the vector database along with a related "key."

```
Metadata 1:
{
embedding: [−0.4291, 0.513, 1.69, −2.01, 5.67,.....]
date: 2023-12-12
dataobject: "Sales lead 1: James Taylor.."
dataobject_source: "sales_leads_company_foo.doc"
rbac_roles: admin OR sales manager
}
Metadata 2:
{
embedding: [0.8261, 8.23, 2.69, −2.01, 5.67,.....]
date: 2023-12-15
dataobject: "Sales lead 2: Paul Simon.."
dataobject_source: "sales_leads_company_foo.doc"
rbac_roles: NOT sales manager
}
Metadata 3:
{
embedding: [2.61, 8.13, 2.69, −2.01, 5.67,.....]
date: 2023-12-16
dataobject: "Sales lead 3: John Lennon.."
dataobject_source: "sales_leads_company_foo.doc"
rbac_roles: admin OR sales manager
}
```

During the retrieval phase, when a user enters the input prompt (or query) in the model interface (e.g., chat interface), the cloud platform 215 may convert the input prompt into a vector. The policy implementation service 225 may then use the vector to query the vector database 240 to retrieve one or more data objects similar to the converted prompt. For instance, the retrieval augmented generation module 230 may convert the received request into one or more vectors, and may query the data source (e.g., vector database 240) using the one or more vectors to retrieve the one or more data objects. In such cases, the one or more data objects may be identified based on a comparison between the one or more vectors and the set of data objects. In some examples, a user (or an administrator) may configure the number of data objects returned by the vector database 240 and if no objects are returned, the retrieval augmented generation module 230 may directly inform the user that the prompt failed to retrieve any data object.

During the retrieval phase, the role of the user may be collected along with the prompt. For example, the model interface 210 (or other component of the cloud platform 215) may collect the role of the user (making the query) from the meta data received via the model interface 201 (e.g., chat interface). In some cases, the role information may be collected via a connection to an external identity management service. The authorization module 235 may compare the user's role to the policies attached in the retrieved objects. If the policies are satisfied, then the authorization module 235 may pass the data objects (e.g., output) to the large language model 220. If the policies are not satisfied, then the authorization module a response is sent to the user saying their query cannot be satisfied with the data provided.

In some cases, the authorization module 235 may determine that the data access role information associated with the user satisfies the data access policy information associated with the one or more data objects. In some examples, inputting the one or more data objects to the large language model 220 may be based on the data access role information associated with the user satisfying the data access policy information associated with the one or more data objects. Alternatively, the authorization module 235 may determine that the data access role information associated with the user fails to satisfy the data access policy information associated with the one or more data objects. The authorization module 235 may compare the data access role information associated with the user with a data access policy information associated with the set of data objects. In such cases, the authorization module 235 may transmit, to the user device, a notification indication that the request is not satisfied based on the data access role information associated with the user not satisfying the data access policy information associated with the set of data objects.

In some examples, the cloud platform 215 may transmit the results from the retrieval phase combined with the user prompt to the large language model 220. The large language model 220 may then combine all the results and generate a response to the prompt/query in natural language and sends the result back to the user via the model interface 210. As discussed herein, in the generation phase, the authorization module 235 may allow the data objects that pass the policy check (e.g., role based access control check) to be inputted into the large language model 220. Thus, the user may see the response generated with objects that they are authorized to access. In some examples, the user may receive the response along with citations for the data objects used in generating the response (that can be logged and checked later for possible unauthorized access). According to the one or more aspects depicted herein, users can get fine grained access to data they are authorized to get access to and may still avail the large language model driven application features.

In this example, Metadata 3 (depicted herein) may be the result of the transformation process of the private data.

```
Metadata 3:
{
embedding: [2.61, 8.13, 2.69, −2.01, 5.67,.....]
date: 2023-12-16
dataobject: "Sales lead 3: John Lennon.."
dataobject__source: "sales__leads__company__foo.doc"
rbac__roles: admin OR sales manager
}
```

The private data, in this example, includes one file that includes a sales leads (sales_leads_company_foo.doc). The document may include policies around individual records. In this example, if the user who queries is a sales manager, the cloud platform 215 may perform a role based authorization control check using the metadata on the roles and determine that data records 1 and 3 get passed to the large language model 220 (metadata record 2 has NOT sales manager, hence the authorization check fails on this). In this example, if the person who enters the prompt is not a sales manager or not an administrator, then no records are passed to the large language model 220 as the user is not authorized to view any records. According to the aspects depicted herein, the role based authorization control check performed by the authorization module 235 (and one or more additional components of the cloud platform 215) may check the current policies associated with data objects and may handle multiple checks in parallel.

Figure 3:
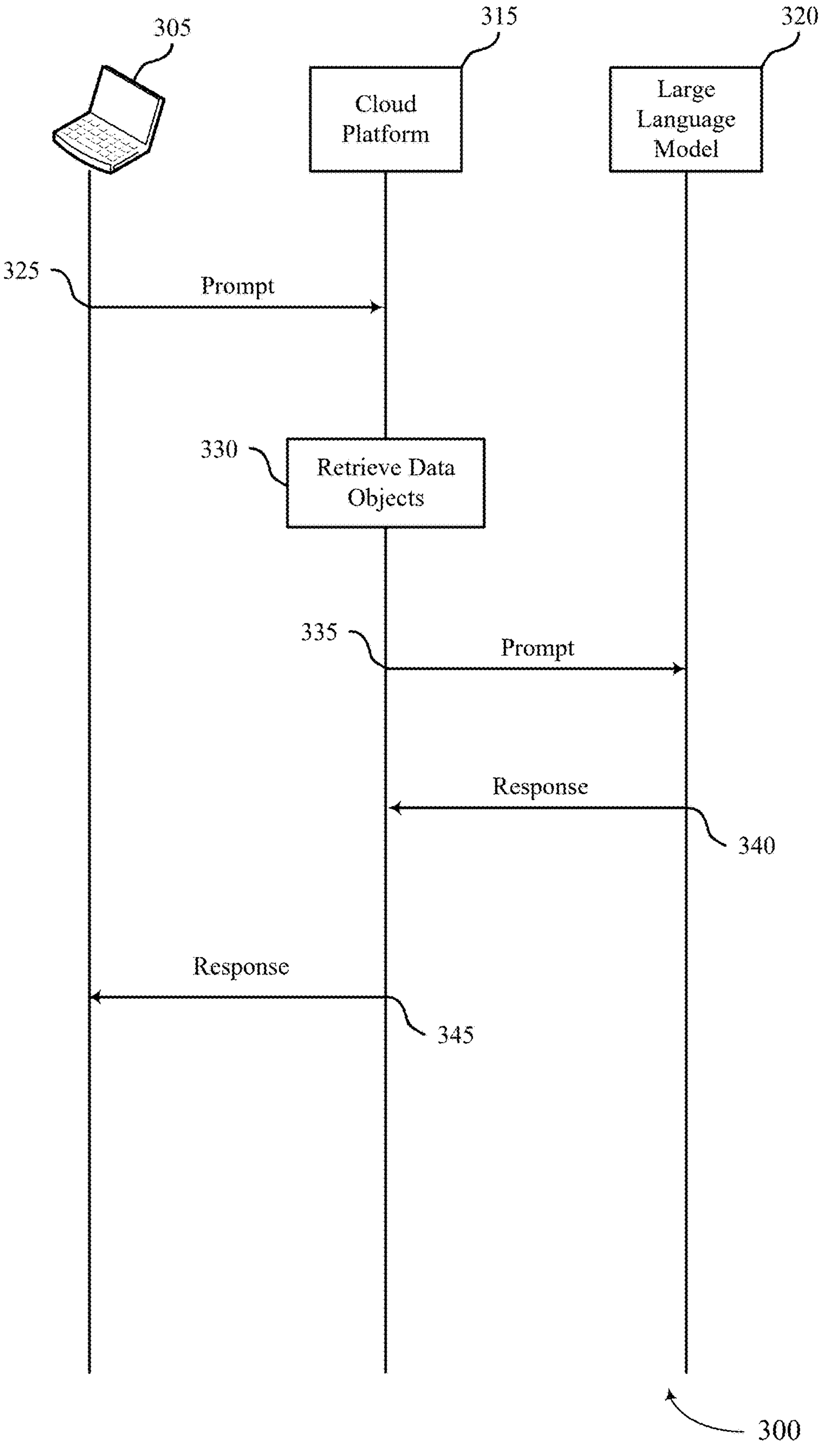
FIG. 3 shows an example of a process flow that supports techniques to perform authorization on large language model responses in accordance with aspects of the present disclosure.

FIG. 3 shows an example of a process flow 300 that supports techniques to perform authorization on large language model responses in accordance with aspects of the present disclosure. The process flow 300 includes a client 305, a cloud platform 315, and a large language model 320, which may be examples of the corresponding devices and systems as described with respect to FIGS. 1 through 2.

At 325, a model interface of the cloud platform may receive, from the client 305, a request for a response from the large language model 320. In some case, the request may include a prompt for the large language model 320 and data access role information associated with the user.

At 330, the cloud platform 315 may retrieve, from a data source including a set of data objects, one or more data objects for inputting to the large language model 320 based on comparing the data access role information associated with the user with data access policy information associated with the one or more data objects.

At 335, the cloud platform 315 may input, via a model interface, the one or more data objects to the large language model 320.

At 340, the cloud platform 315 may receive, via the model interface, an output of the large language model based on the one or more data objects. In some cases, the output may include the response to the request including the prompt.

At 345, the cloud platform 315 may transmit the response to the client 305.

Figure 4:
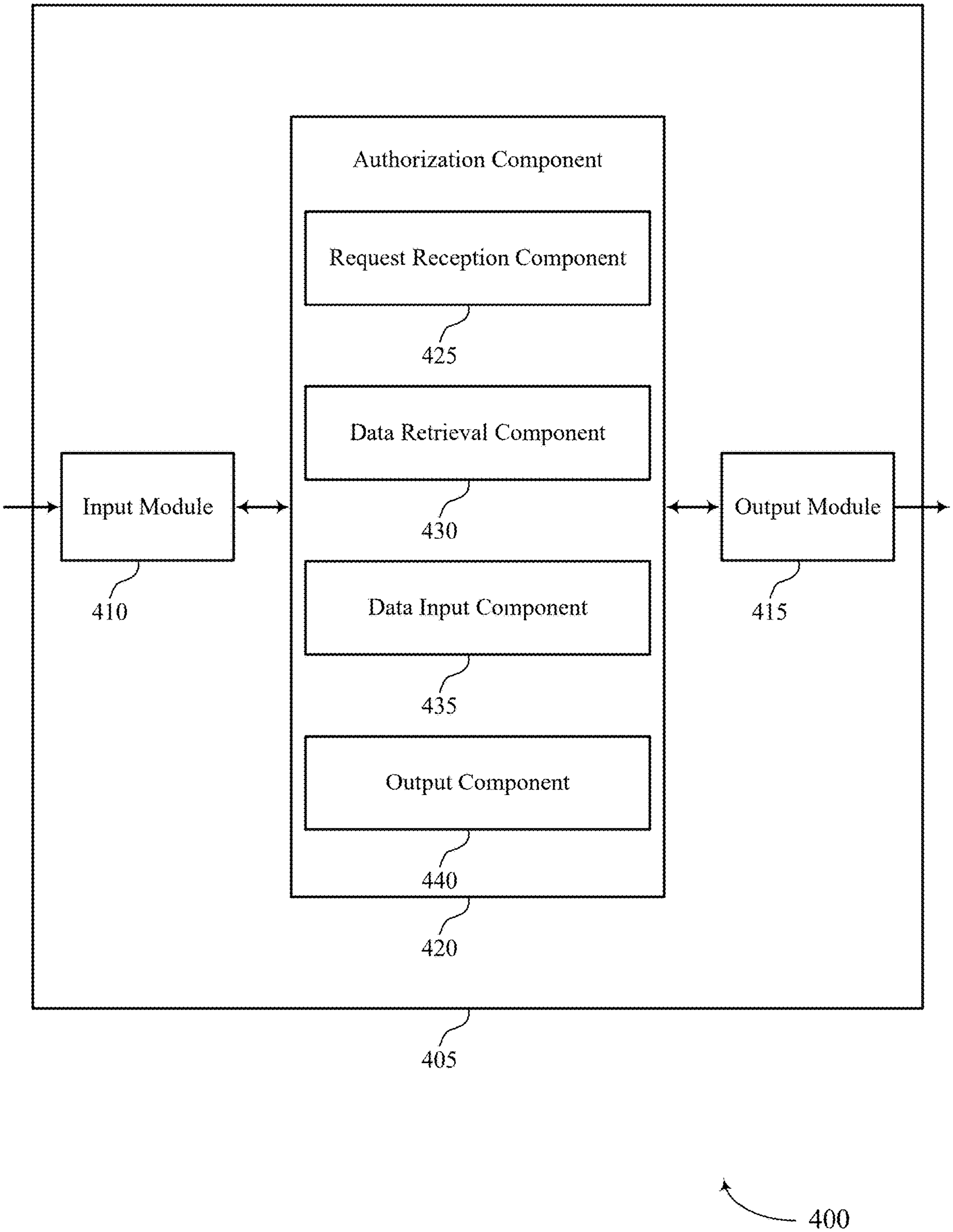
FIG. 4 shows a block diagram of an apparatus that supports techniques to perform authorization on large language model responses in accordance with aspects of the present disclosure.

FIG. 4 shows a block diagram 400 of a device 405 that supports techniques to perform authorization on large language model responses in accordance with aspects of the present disclosure. The device 405 may include an input module 410, an output module 415, and an authorization component 420. The device 405, or one of more components of the device 405 (e.g., the input module 410, the output module 415, the authorization component 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the authorization component 420 to support techniques to perform authorization on large language model responses. In some cases, the input module 410 may be a component of an input/output (I/O) controller 610 as described with reference to FIG. 6.

The output module 415 may manage output signals for the device 405. For example, the output module 415 may receive signals from other components of the device 405, such as the authorization component 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the authorization component 420 may include a request reception component 425, a data retrieval component 430, a data input component 435, an output component 440, or any combination thereof. In some examples, the authorization component 420, or various components thereof, may be configured to perform various operations (e.g., receiving, monitoring, transmitting) using or otherwise in cooperation with the input module 410, the output module 415, or both. For example, the authorization component 420 may receive information from the input module 410, send information to the output module 415, or be integrated in combination with the input module 410, the output module 415, or both to receive information, transmit information, or perform various other operations as described herein.

The authorization component 420 may support data processing in accordance with examples as disclosed herein. The request reception component 425 may be configured to support receiving, from a user and at an interface for accessing a large language model, a request for a response from the large language model, the request including a prompt for the large language model and data access role information associated with the user. The data retrieval component 430 may be configured to support retrieving, from a data source including a set of multiple data objects, one or more data objects for inputting to the large language model based on comparing the data access role information associated with the user with data access policy information associated with the one or more data objects. The data input component 435 may be configured to support inputting, via a model interface, the one or more data objects to the large language model. The output component 440 may be configured to support receiving, via the model interface, an output of the large language model based on the one or more data objects, the output including the response to the request including the prompt.

Figure 5:
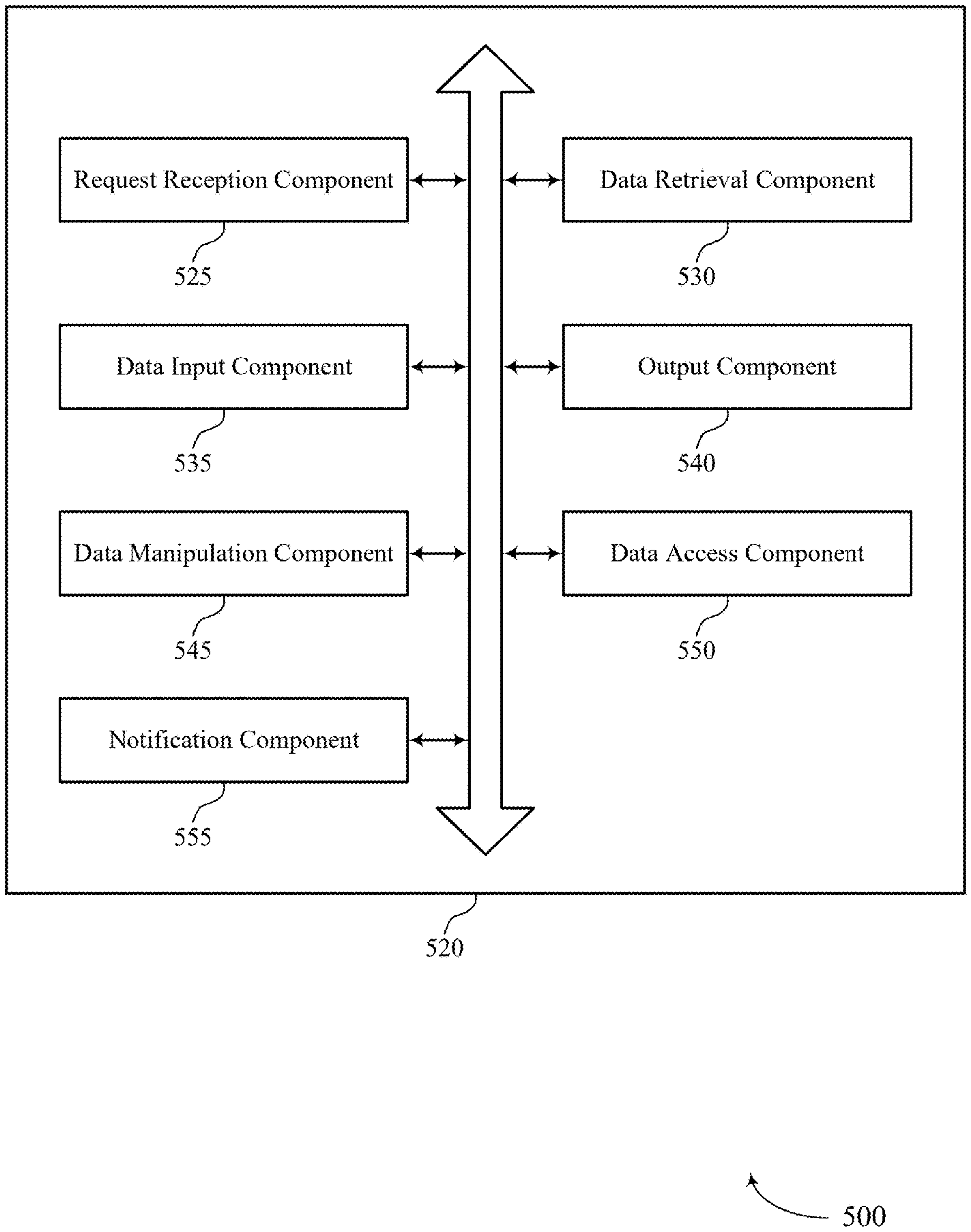
FIG. 5 shows a block diagram of an authorization component that supports techniques to perform authorization on large language model responses in accordance with aspects of the present disclosure.

FIG. 5 shows a block diagram 500 of an authorization component 520 that supports techniques to perform authorization on large language model responses in accordance with aspects of the present disclosure. The authorization component 520 may be an example of aspects of an authorization component or an authorization component 420, or both, as described herein. The authorization component 520, or various components thereof, may be an example of means for performing various aspects of techniques to perform authorization on large language model responses as described herein. For example, the authorization component 520 may include a request reception component 525, a data retrieval component 530, a data input component 535, an output component 540, a data manipulation component 545, a data access component 550, a notification component 555, or any combination thereof. Each of these components, or components of subcomponents thereof (e.g., one or more processors, one or more memories), may communicate, directly or indirectly, with one another (e.g., via one or more buses).

The authorization component 520 may support data processing in accordance with examples as disclosed herein. The request reception component 525 may be configured to support receiving, from a user and at an interface for accessing a large language model, a request for a response from the large language model, the request including a prompt for the large language model and data access role information associated with the user. The data retrieval component 530 may be configured to support retrieving, from a data source including a set of multiple data objects, one or more data objects for inputting to the large language model based on comparing the data access role information associated with the user with data access policy information associated with the one or more data objects. The data input component 535 may be configured to support inputting, via a model interface, the one or more data objects to the large language model. The output component 540 may be configured to support receiving, via the model interface, an output of the large language model based on the one or more data objects, the output including the response to the request including the prompt.

In some examples, the data manipulation component 545 may be configured to support transforming a set of multiple data records into a set of multiple vectors, where the set of multiple vectors include the set of multiple data objects. In some examples, the data manipulation component 545 may be configured to support storing, prior to receiving the request from the user, the set of multiple vectors in the data source.

In some examples, the data manipulation component 545 may be configured to support augmenting the set of multiple vectors stored in the data source with role information metadata associated with each data record of the set of multiple data records, where the data access policy information associated with the set of multiple data objects is based on the role information metadata.

In some examples, the augmented set of multiple vectors include a set of multiple key value pairs. In some examples, the role information metadata associated with each data record of the set of multiple data records is stored in a key of each corresponding key value pair of the set of multiple key value pairs.

In some examples, the request reception component 525 may be configured to support converting the received request into one or more vectors. In some examples, the data retrieval component 530 may be configured to support querying the data source using the one or more vectors to retrieve the one or more data objects, where the one or more data objects are identified based on a comparison between the one or more vectors and the set of multiple data objects.

In some examples, the data input component 535 may be configured to support determining that the data access role information associated with the user satisfies the data access policy information associated with the one or more data objects, where inputting the one or more data objects to the large language model is based on the data access role information associated with the user satisfying the data access policy information associated with the one or more data objects.

In some examples, the request reception component 525 may be configured to support receiving, from a second user and at the interface for accessing the large language model, a second request for a second response from the large language model, the second request including a second prompt for the large language model and a second data access role information associated with the second user. In some examples, the data retrieval component 530 may be configured to support retrieving, from the data source, a second set of data objects associated with the second request. In some examples, the data access component 550 may be configured to support comparing the second data access role information associated with the second user with a second data access policy information associated with the second set of data objects.

In some examples, the data access component 550 may be configured to support determining that the second data access role information associated with the second user does not satisfy the second data access policy information associated with the second set of data objects. In some examples, the notification component 555 may be configured to support transmitting, to the user, a notification indication that the second request is not satisfied based on the second data access role information associated with the second user not satisfying the second data access policy information associated with the second set of data objects.

Figure 6:
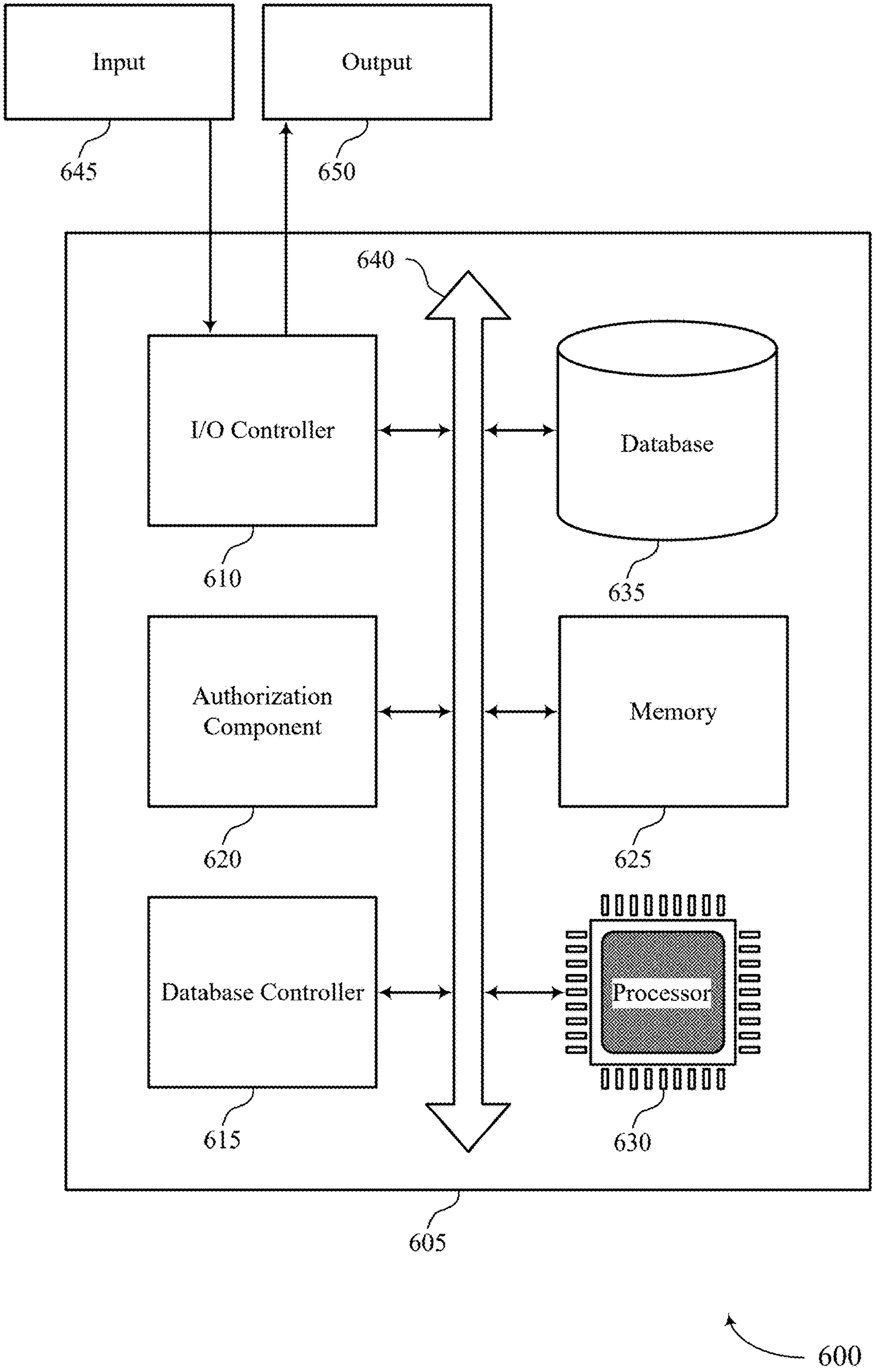
FIG. 6 shows a diagram of a system including a device that supports techniques to perform authorization on large language model responses in accordance with aspects of the present disclosure.

FIG. 6 shows a diagram of a system 600 including a device 605 that supports techniques to perform authorization on large language model responses in accordance with aspects of the present disclosure. The device 605 may be an example of or include components of a device 405 as described herein. The device 605 may include components for bi-directional data communications including components for transmitting and receiving communications, such as an authorization component 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting techniques to perform authorization on large language model responses). The processor 630 may be an example of a single processor or multiple processors. For example, the device 605 may include one or more processors 630.

The authorization component 620 may support data processing in accordance with examples as disclosed herein. For example, the authorization component 620 may be configured to support receiving, from a user and at an interface for accessing a large language model, a request for a response from the large language model, the request including a prompt for the large language model and data access role information associated with the user. The authorization component 620 may be configured to support retrieving, from a data source including a set of multiple data objects, one or more data objects for inputting to the large language model based on comparing the data access role information associated with the user with data access policy information associated with the one or more data objects. The authorization component 620 may be configured to support inputting, via a model interface, the one or more data objects to the large language model. The authorization component 620 may be configured to support receiving, via the model interface, an output of the large language model based on the one or more data objects, the output including the response to the request including the prompt.

By including or configuring the authorization component 620 in accordance with examples as described herein, the device 605 may support techniques for improved user experience, improved system reliability, reduced latency, and more efficient utilization of resources and processing capability.

Figure 7:
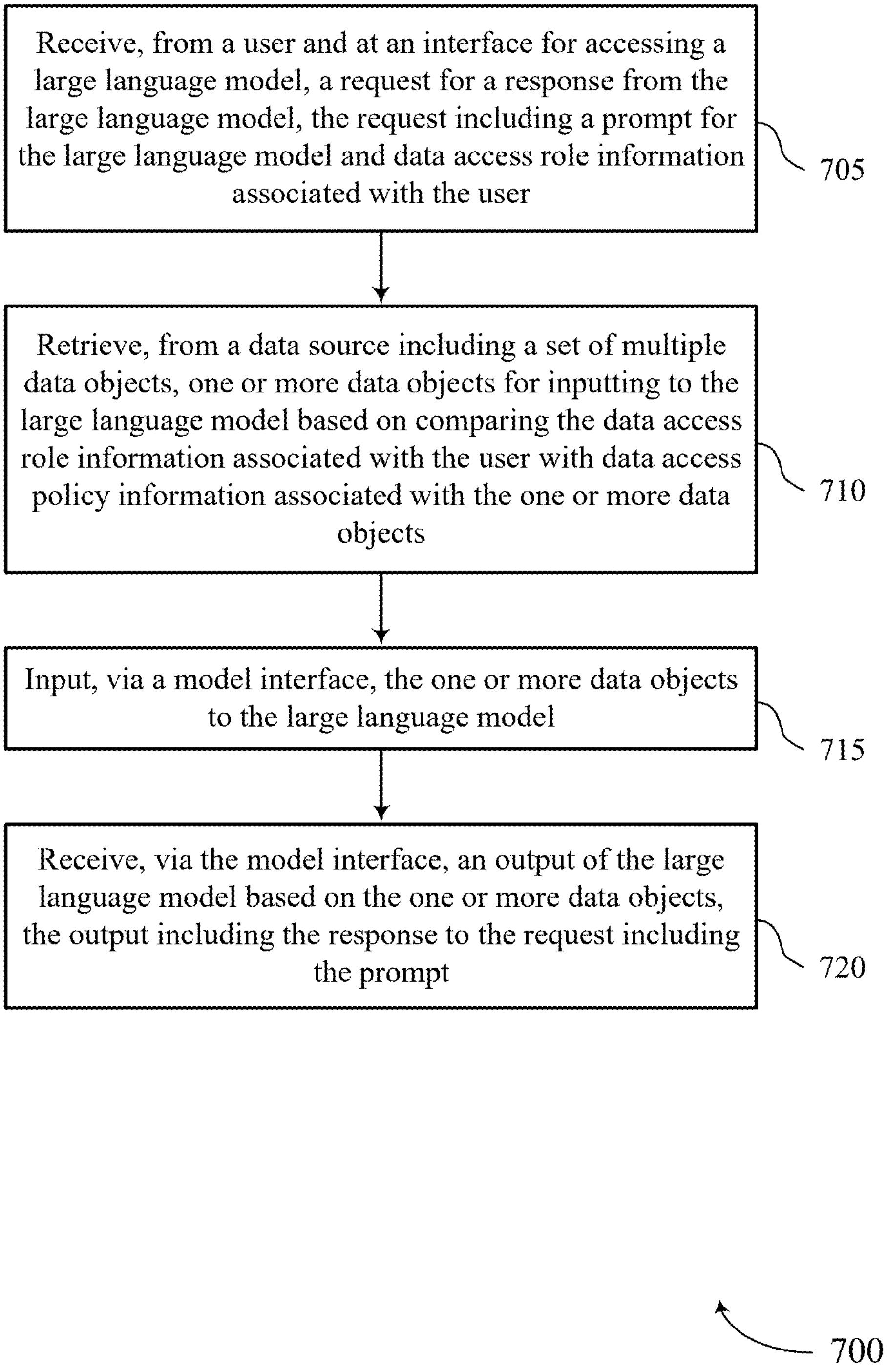
FIGS. 7 through 9 show flowcharts illustrating methods that support techniques to perform authorization on large language model responses in accordance with aspects of the present disclosure.

FIG. 7 shows a flowchart illustrating a method 700 that supports techniques to perform authorization on large language model responses in accordance with aspects of the present disclosure. The operations of the method 700 may be implemented by a device (e.g., an application server) or its components as described herein. For example, the operations of the method 700 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 705, the method may include receiving, from a user and at an interface for accessing a large language model, a request for a response from the large language model, the request including a prompt for the large language model and data access role information associated with the user. The operations of 705 may be performed in accordance with examples as disclosed herein. In some examples, aspects of the operations of 705 may be performed by a request reception component 525 as described with reference to FIG. 5.

At 710, the method may include retrieving, from a data source including a set of multiple data objects, one or more data objects for inputting to the large language model based on comparing the data access role information associated with the user with data access policy information associated with the one or more data objects. The operations of 710 may be performed in accordance with examples as disclosed herein. In some examples, aspects of the operations of 710 may be performed by a data retrieval component 530 as described with reference to FIG. 5.

At 715, the method may include inputting, via a model interface, the one or more data objects to the large language model. The operations of 715 may be performed in accordance with examples as disclosed herein. In some examples, aspects of the operations of 715 may be performed by a data input component 535 as described with reference to FIG. 5.

At 720, the method may include receiving, via the model interface, an output of the large language model based on the one or more data objects, the output including the response to the request including the prompt. The operations of 720 may be performed in accordance with examples as disclosed herein. In some examples, aspects of the operations of 720 may be performed by an output component 540 as described with reference to FIG. 5.

Figure 8:
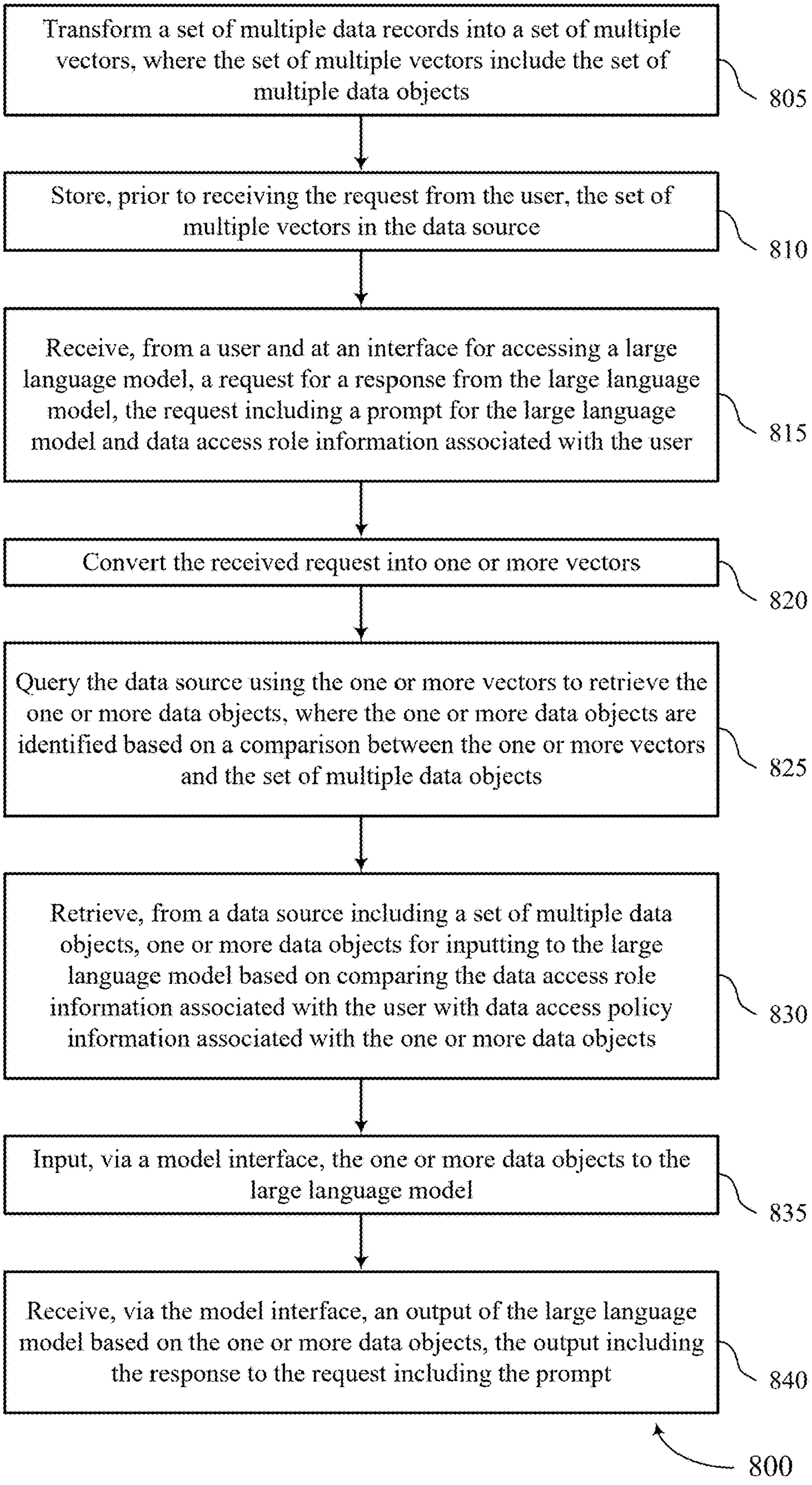

FIG. 8 shows a flowchart illustrating a method 800 that supports techniques to perform authorization on large language model responses in accordance with aspects of the present disclosure. The operations of the method 800 may be implemented by an application server or its components as described herein. For example, the operations of the method 800 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 805, the method may include transforming a set of multiple data records into a set of multiple vectors, where the set of multiple vectors include the set of multiple data objects. The operations of 805 may be performed in accordance with examples as disclosed herein. In some examples, aspects of the operations of 805 may be performed by a data manipulation component 545 as described with reference to FIG. 5.

At 810, the method may include storing, prior to receiving the request from the user, the set of multiple vectors in the data source. The operations of 810 may be performed in accordance with examples as disclosed herein. In some examples, aspects of the operations of 810 may be performed by a data manipulation component 545 as described with reference to FIG. 5.

At 815, the method may include receiving, from a user and at an interface for accessing a large language model, a request for a response from the large language model, the request including a prompt for the large language model and data access role information associated with the user. The operations of 815 may be performed in accordance with examples as disclosed herein. In some examples, aspects of the operations of 815 may be performed by a request reception component 525 as described with reference to FIG. 5.

At 820, the method may include converting the received request into one or more vectors. The operations of 820 may be performed in accordance with examples as disclosed herein. In some examples, aspects of the operations of 820 may be performed by a request reception component 525 as described with reference to FIG. 5.

At 825, the method may include querying the data source using the one or more vectors to retrieve the one or more data objects, where the one or more data objects are identified based on a comparison between the one or more vectors and the set of multiple data objects. The operations of 825 may be performed in accordance with examples as disclosed herein. In some examples, aspects of the operations of 825 may be performed by a data retrieval component 530 as described with reference to FIG. 5.

At 830, the method may include retrieving, from a data source including a set of multiple data objects, one or more data objects for inputting to the large language model based on comparing the data access role information associated with the user with data access policy information associated with the one or more data objects. The operations of 830 may be performed in accordance with examples as disclosed herein. In some examples, aspects of the operations of 830 may be performed by a data retrieval component 530 as described with reference to FIG. 5.

At 835, the method may include inputting, via a model interface, the one or more data objects to the large language model. The operations of 835 may be performed in accordance with examples as disclosed herein. In some examples, aspects of the operations of 835 may be performed by a data input component 535 as described with reference to FIG. 5.

At 840, the method may include receiving, via the model interface, an output of the large language model based on the one or more data objects, the output including the response to the request including the prompt. The operations of 840 may be performed in accordance with examples as disclosed herein. In some examples, aspects of the operations of 840 may be performed by an output component 540 as described with reference to FIG. 5.

Figure 9:
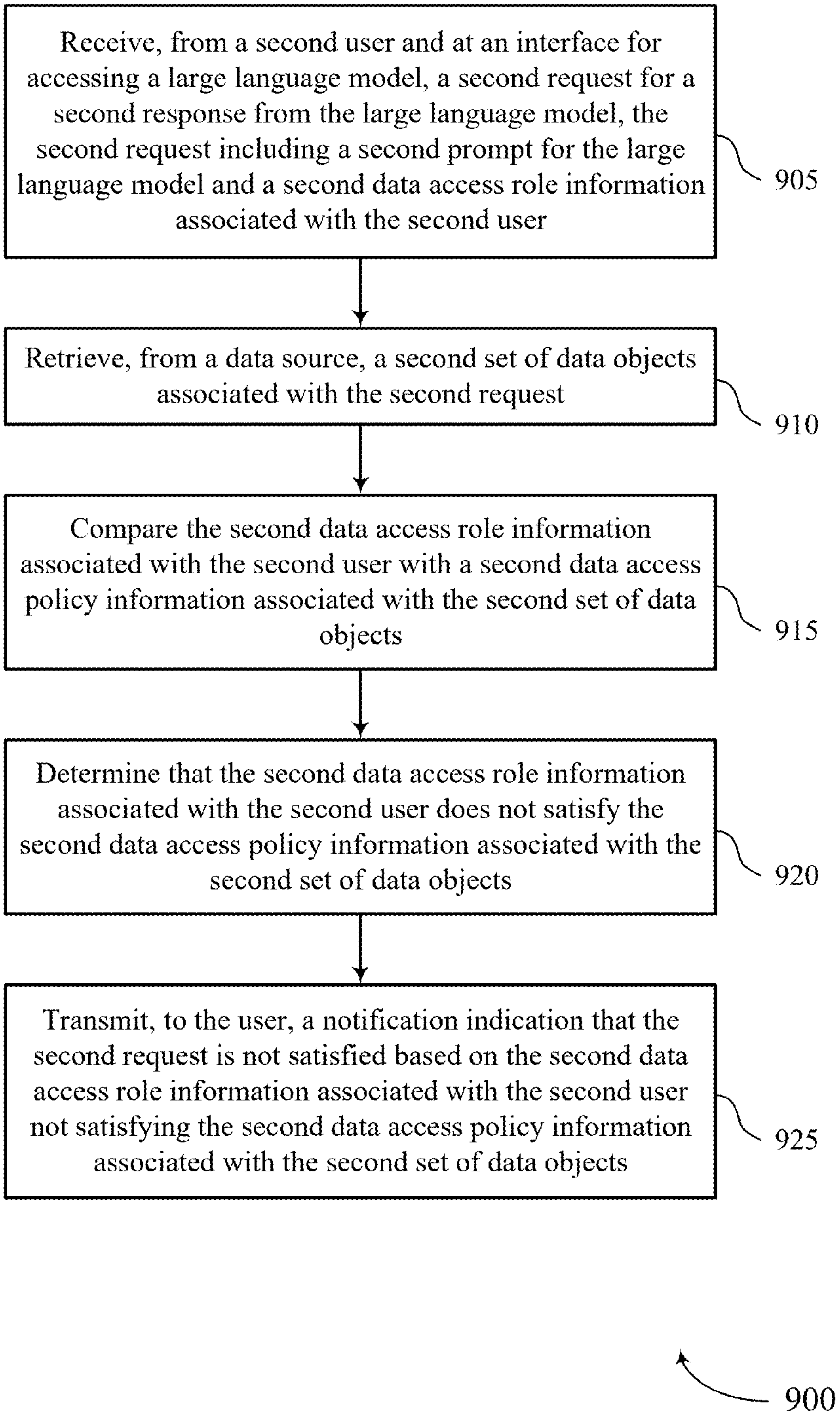

FIG. 9 shows a flowchart illustrating a method 900 that supports techniques to perform authorization on large language model responses in accordance with aspects of the present disclosure. The operations of the method 900 may be implemented by an application server or its components as described herein. For example, the operations of the method 900 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 905, the method may include receiving, from a second user and at an interface for accessing a large language model, a second request for a second response from the large language model, the second request including a second prompt for the large language model and a second data access role information associated with the second user. The operations of 905 may be performed in accordance with examples as disclosed herein. In some examples, aspects of the operations of 905 may be performed by a request reception component 525 as described with reference to FIG. 5.

At 910, the method may include retrieving, from a data source, a second set of data objects associated with the second request. The operations of 910 may be performed in accordance with examples as disclosed herein. In some examples, aspects of the operations of 910 may be performed by a data retrieval component 530 as described with reference to FIG. 5.

At 915, the method may include comparing the second data access role information associated with the second user with a second data access policy information associated with the second set of data objects. The operations of 915 may be performed in accordance with examples as disclosed herein. In some examples, aspects of the operations of 915 may be performed by a data access component 550 as described with reference to FIG. 5.

At 920, the method may include determining that the second data access role information associated with the second user does not satisfy the second data access policy information associated with the second set of data objects. The operations of 920 may be performed in accordance with examples as disclosed herein. In some examples, aspects of the operations of 920 may be performed by a data access component 550 as described with reference to FIG. 5.

At 925, the method may include transmitting, to the user, a notification indication that the second request is not satisfied based on the second data access role information associated with the second user not satisfying the second data access policy information associated with the second set of data objects. The operations of 925 may be performed in accordance with examples as disclosed herein. In some examples, aspects of the operations of 925 may be performed by a notification component 555 as described with reference to FIG. 5.

A method for data processing by an apparatus is described. The method may include receiving, from a user and at an interface for accessing a large language model, a request for a response from the large language model, the request including a prompt for the large language model and data access role information associated with the user, retrieving, from a data source including a set of multiple data objects, one or more data objects for inputting to the large language model based on comparing the data access role information associated with the user with data access policy information associated with the one or more data objects, inputting, via a model interface, the one or more data objects to the large language model, and receiving, via the model interface, an output of the large language model based on the one or more data objects, the output including the response to the request including the prompt.

An apparatus for data processing is described. The apparatus may include one or more memories storing processor executable code, and one or more processors coupled with the one or more memories. The one or more processors may individually or collectively be operable to execute the code to cause the apparatus to receive, from a user and at an interface for accessing a large language model, a request for a response from the large language model, the request including a prompt for the large language model and data access role information associated with the user, retrieve, from a data source including a set of multiple data objects, one or more data objects for inputting to the large language model based on comparing the data access role information associated with the user with data access policy information associated with the one or more data objects, input, via a model interface, the one or more data objects to the large language model, and receive, via the model interface, an output of the large language model based on the one or more data objects, the output including the response to the request including the prompt.

Another apparatus for data processing is described. The apparatus may include means for receiving, from a user and at an interface for accessing a large language model, a request for a response from the large language model, the request including a prompt for the large language model and data access role information associated with the user, means for retrieving, from a data source including a set of multiple data objects, one or more data objects for inputting to the large language model based on comparing the data access role information associated with the user with data access policy information associated with the one or more data objects, means for inputting, via a model interface, the one or more data objects to the large language model, and means for receiving, via the model interface, an output of the large language model based on the one or more data objects, the output including the response to the request including the prompt.

A non-transitory computer-readable medium storing code for data processing is described. The code may include instructions executable by one or more processors to receive, from a user and at an interface for accessing a large language model, a request for a response from the large language model, the request including a prompt for the large language model and data access role information associated with the user, retrieve, from a data source including a set of multiple data objects, one or more data objects for inputting to the large language model based on comparing the data access role information associated with the user with data access policy information associated with the one or more data objects, input, via a model interface, the one or more data objects to the large language model, and receive, via the model interface, an output of the large language model based on the one or more data objects, the output including the response to the request including the prompt.

Some examples of the method, apparatus, and non-transitory computer-readable medium described herein may further include operations, features, means, or instructions for transforming a set of multiple data records into a set of multiple vectors, where the set of multiple vectors include the set of multiple data objects and storing, prior to receiving the request from the user, the set of multiple vectors in the data source.

Some examples of the method, apparatus, and non-transitory computer-readable medium described herein may further include operations, features, means, or instructions for augmenting the set of multiple vectors stored in the data source with role information metadata associated with each data record of the set of multiple data records, where the data access policy information associated with the set of multiple data objects may be based on the role information metadata.

In some examples of the method, apparatus, and non-transitory computer-readable medium described herein, the augmented set of multiple vectors include a set of multiple key value pairs and the role information metadata associated with each data record of the set of multiple data records may be stored in a key of each corresponding key value pair of the set of multiple key value pairs.

Some examples of the method, apparatus, and non-transitory computer-readable medium described herein may further include operations, features, means, or instructions for converting the received request into one or more vectors and querying the data source using the one or more vectors to retrieve the one or more data objects, where the one or more data objects may be identified based on a comparison between the one or more vectors and the set of multiple data objects.

Some examples of the method, apparatus, and non-transitory computer-readable medium described herein may further include operations, features, means, or instructions for determining that the data access role information associated with the user satisfies the data access policy information associated with the one or more data objects, where inputting the one or more data objects to the large language model may be based on the data access role information associated with the user satisfying the data access policy information associated with the one or more data objects.

Some examples of the method, apparatus, and non-transitory computer-readable medium described herein may further include operations, features, means, or instructions for receiving, from a second user and at the interface for accessing the large language model, a second request for a second response from the large language model, the second request including a second prompt for the large language model and a second data access role information associated with the second user, retrieving, from the data source, a second set of data objects associated with the second request, and comparing the second data access role information associated with the second user with a second data access policy information associated with the second set of data objects.

Some examples of the method, apparatus, and non-transitory computer-readable medium described herein may further include operations, features, means, or instructions for determining that the second data access role information associated with the second user does not satisfy the second data access policy information associated with the second set of data objects and transmitting, to the user, a notification indication that the second request may be not satisfied based on the second data access role information associated with the second user not satisfying the second data access policy information associated with the second set of data objects.

The following provides an overview of aspects of the present disclosure:

Aspect 1: A method for data processing, comprising: receiving, from a user and at an interface for accessing a large language model, a request for a response from the large language model, the request comprising a prompt for the large language model and data access role information associated with the user; retrieving, from a data source comprising a plurality of data objects, one or more data objects for inputting to the large language model based at least in part on comparing the data access role information associated with the user with data access policy information associated with the one or more data objects; inputting, via a model interface, the one or more data objects to the large language model; and receiving, via the model interface, an output of the large language model based at least in part on the one or more data objects, the output comprising the response to the request comprising the prompt.

Aspect 2: The method of aspect 1, further comprising: transforming a plurality of data records into a plurality of vectors, wherein the plurality of vectors comprise the plurality of data objects; and storing, prior to receiving the request from the user, the plurality of vectors in the data source.

Aspect 3: The method of aspect 2, further comprising: augmenting the plurality of vectors stored in the data source with role information metadata associated with each data record of the plurality of data records, wherein the data access policy information associated with the plurality of data objects is based at least in part on the role information metadata.

Aspect 4: The method of aspect 3, wherein the augmented plurality of vectors comprise a plurality of key value pairs, and the role information metadata associated with each data record of the plurality of data records is stored in a key of each corresponding key value pair of the plurality of key value pairs.

Aspect 5: The method of any of aspects 1 through 4, further comprising: converting the received request into one or more vectors; and querying the data source using the one or more vectors to retrieve the one or more data objects, wherein the one or more data objects are identified based at least in part on a comparison between the one or more vectors and the plurality of data objects.

Aspect 6: The method of any of aspects 1 through 5, further comprising: determining that the data access role information associated with the user satisfies the data access policy information associated with the one or more data objects, wherein inputting the one or more data objects to the large language model is based at least in part on the data access role information associated with the user satisfying the data access policy information associated with the one or more data objects.

Aspect 7: The method of any of aspects 1 through 6, further comprising: receiving, from a second user and at the interface for accessing the large language model, a second request for a second response from the large language model, the second request comprising a second prompt for the large language model and a second data access role information associated with the second user; retrieving, from the data source, a second set of data objects associated with the second request; and comparing the second data access role information associated with the second user with a second data access policy information associated with the second set of data objects.

Aspect 8: The method of aspect 7, further comprising: determining that the second data access role information associated with the second user does not satisfy the second data access policy information associated with the second set of data objects; and transmitting, to the user, a notification indication that the second request is not satisfied based at least in part on the second data access role information associated with the second user not satisfying the second data access policy information associated with the second set of data objects.

Aspect 9: An apparatus for data processing, comprising one or more memories storing processor-executable code, and one or more processors coupled with the one or more memories and individually or collectively operable to execute the code to cause the apparatus to perform a method of any of aspects 1 through 8.

Aspect 10: An apparatus for data processing, comprising at least one means for performing a method of any of aspects 1 through 8.

Aspect 11: A non-transitory computer-readable medium storing code for data processing, the code comprising instructions executable by one or more processors to perform a method of any of aspects 1 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, from a user and at an interface for accessing a large language model, a request for a response from the large language model, the request comprising a prompt for the large language model and data access role information associated with the user;

converting the received request, comprising the prompt and the data access role information, into one or more vectors;

querying a data source comprising a plurality of data objects using the one or more vectors;

retrieving, from the data source and in response to the querying, one or more data objects for inputting to the large language model based at least in part on comparing the data access role information associated with the user with data access policy information associated with the one or more data objects, wherein the one or more data objects are identified based at least in part on a comparison between the one or more vectors and the plurality of data objects;

inputting, via a model interface, the one or more data objects to the large language model; and receiving, via the model interface, an output of the large language model based at least in part on the one or more data objects, the output comprising the response to the request comprising the prompt.

2. The method of claim 1, further comprising:

transforming a plurality of data records into a plurality of vectors, wherein the plurality of vectors comprise the plurality of data objects; and storing, prior to receiving the request from the user, the plurality of vectors in the data source.

3. The method of claim 2, further comprising:

augmenting the plurality of vectors stored in the data source with role information metadata associated with each data record of the plurality of data records, wherein the data access policy information associated with the plurality of data objects is based at least in part on the role information metadata.

4. The method of claim 3, wherein:

the augmented plurality of vectors comprise a plurality of key value pairs, and the role information metadata associated with each data record of the plurality of data records is stored in a key of each corresponding key value pair of the plurality of key value pairs.

5. The method of claim 1, further comprising:

determining that the data access role information associated with the user satisfies the data access policy information associated with the one or more data objects, wherein inputting the one or more data objects to the large language model is based at least in part on the data access role information associated with the user satisfying the data access policy information associated with the one or more data objects.

6. The method of claim 1, further comprising:

receiving, from a second user and at the interface for accessing the large language model, a second request for a second response from the large language model, the second request comprising a second prompt for the large language model and a second data access role information associated with the second user;

retrieving, from the data source, a second set of data objects associated with the second request; and comparing the second data access role information associated with the second user with a second data access policy information associated with the second set of data objects.

7. The method of claim 6, further comprising:

determining that the second data access role information associated with the second user does not satisfy the second data access policy information associated with the second set of data objects; and transmitting, to the user, a notification indication that the second request is not satisfied based at least in part on the second data access role information associated with the second user not satisfying the second data access policy information associated with the second set of data objects.

8. An apparatus for data processing, comprising:

one or more memories storing processor-executable code; and one or more processors coupled with the one or more memories and individually or collectively operable to execute the code to cause the apparatus to:

receive, from a user and at an interface for accessing a large language model, a request for a response from the large language model, the request comprising a prompt for the large language model and data access role information associated with the user;

convert the received request, comprising the prompt and the data access role information, into one or more vectors;

query a data source comprising a plurality of data objects using the one or more vectors;

retrieve, from the data source and in response to the querying, one or more data objects for inputting to the large language model based at least in part on comparing the data access role information associated with the user with data access policy information associated with the one or more data objects, wherein the one or more data objects are identified based at least in part on a comparison between the one or more vectors and the plurality of data objects;

input, via a model interface, the one or more data objects to the large language model; and receive, via the model interface, an output of the large language model based at least in part on the one or more data objects, the output comprising the response to the request comprising the prompt.

9. The apparatus of claim 8, wherein the one or more processors are individually or collectively further operable to execute the code to cause the apparatus to:

transform a plurality of data records into a plurality of vectors, wherein the plurality of vectors comprise the plurality of data objects; and store, prior to receiving the request from the user, the plurality of vectors in the data source.

10. The apparatus of claim 9, wherein the one or more processors are individually or collectively further operable to execute the code to cause the apparatus to:

augment the plurality of vectors stored in the data source with role information metadata associated with each data record of the plurality of data records, wherein the data access policy information associated with the plurality of data objects is based at least in part on the role information metadata.

11. The apparatus of claim 10, wherein:

the augmented plurality of vectors comprise a plurality of key value pairs, and the role information metadata associated with each data record of the plurality of data records is stored in a key of each corresponding key value pair of the plurality of key value pairs.

12. The apparatus of claim 8, wherein the one or more processors are individually or collectively further operable to execute the code to cause the apparatus to:

determine that the data access role information associated with the user satisfies the data access policy information associated with the one or more data objects, wherein inputting the one or more data objects to the large language model is based at least in part on the data access role information associated with the user satisfying the data access policy information associated with the one or more data objects.

13. The apparatus of claim 8, wherein the one or more processors are individually or collectively further operable to execute the code to cause the apparatus to:

receive, from a second user and at the interface for accessing the large language model, a second request for a second response from the large language model, the second request comprising a second prompt for the large language model and a second data access role information associated with the second user;

retrieve, from the data source, a second set of data objects associated with the second request; and compare the second data access role information associated with the second user with a second data access policy information associated with the second set of data objects.

14. The apparatus of claim 13, wherein the one or more processors are individually or collectively further operable to execute the code to cause the apparatus to:

determine that the second data access role information associated with the second user does not satisfy the second data access policy information associated with the second set of data objects; and transmit, to the user, a notification indication that the second request is not satisfied based at least in part on the second data access role information associated with the second user not satisfying the second data access policy information associated with the second set of data objects.

15. A non-transitory computer-readable medium storing code for data processing, the code comprising instructions executable by one or more processors to:

receive, from a user and at an interface for accessing a large language model, a request for a response from the large language model, the request comprising a prompt for the large language model and data access role information associated with the user;

convert the received request, comprising the prompt and the data access role information, into one or more vectors;

query a data source comprising a plurality of data objects using the one or more vectors;

retrieve, from the data source and in response to the querying, one or more data objects for inputting to the large language model based at least in part on comparing the data access role information associated with the user with data access policy information associated with the one or more data objects, wherein the one or more data objects are identified based at least in part on a comparison between the one or more vectors and the plurality of data objects;

input, via a model interface, the one or more data objects to the large language model; and receive, via the model interface, an output of the large language model based at least in part on the one or more data objects, the output comprising the response to the request comprising the prompt.

16. The non-transitory computer-readable medium of claim 15, wherein the instructions are further executable by the one or more processors to:

transform a plurality of data records into a plurality of vectors, wherein the plurality of vectors comprise the plurality of data objects; and store, prior to receiving the request from the user, the plurality of vectors in the data source.

17. The non-transitory computer-readable medium of claim 16, wherein the instructions are further executable by the one or more processors to:

augment the plurality of vectors stored in the data source with role information metadata associated with each data record of the plurality of data records, wherein the data access policy information associated with the plurality of data objects is based at least in part on the role information metadata.

18. The non-transitory computer-readable medium of claim 17, wherein:

the augmented plurality of vectors comprise a plurality of key value pairs, and the role information metadata associated with each data record of the plurality of data records is stored in a key of each corresponding key value pair of the plurality of key value pairs.

* * * * *